(12) United States Patent
Kassner et al.

(10) Patent No.: US 11,177,958 B2
(45) Date of Patent: Nov. 16, 2021

(54) PROTECTION OF AUTHENTICATION TOKENS

(71) Applicant: SILVERFORT LTD., Tel Aviv (IL)

(72) Inventors: Yaron Kassner, Hod Hasharon (IL); Hed Kovetz, Atzmon-Segev (IL); Matan Binyamin Fattal, Raanana (IL)

(73) Assignee: SILVERFORT LTD., Tel Aviv (IL)

( * ) Notice: Subject to any disclaimer, the term of this patent is extended or adjusted under 35 U.S.C. 154(b) by 425 days.

(21) Appl. No.: 16/332,367

(22) PCT Filed: Sep. 13, 2017

(86) PCT No.: PCT/IB2017/055516
§ 371 (c)(1),
(2) Date: Mar. 12, 2019

(87) PCT Pub. No.: WO2018/051236
PCT Pub. Date: Mar. 22, 2018

(65) Prior Publication Data
US 2021/0288804 A1    Sep. 16, 2021

Related U.S. Application Data

(60) Provisional application No. 62/393,672, filed on Sep. 13, 2016.

(51) Int. Cl.
*H04L 9/32* (2006.01)
*H04L 9/08* (2006.01)

(52) U.S. Cl.
CPC .......... *H04L 9/3226* (2013.01); *H04L 9/0891* (2013.01); *H04L 9/3234* (2013.01); *H04L 9/3236* (2013.01); *H04L 9/3271* (2013.01)

(58) Field of Classification Search
CPC ... H04L 9/3226; H04L 9/0891; H04L 9/3236; H04L 9/3271
See application file for complete search history.

(56) References Cited

U.S. PATENT DOCUMENTS 5,822,435 A    10/1998  Boelbert et al.
6,134,661 A    10/2000  Topp
(Continued)

FOREIGN PATENT DOCUMENTS

WO    2009031140 A2    3/2009
WO    2010049839 A1    5/2010
(Continued)

OTHER PUBLICATIONS

Microsoft Docs, "Integrate your existing NPS infrastructure with Azure Multi-Factor Authentication", pp. 1-10, Aug. 14, 2017.
(Continued)

*Primary Examiner* — Nelson S. Giddins
*Assistant Examiner* — Alexander R Lapian
(74) *Attorney, Agent, or Firm* — Kligler & Associates Patent Attorneys Ltd

(57) ABSTRACT

Described embodiments include an apparatus, comprising a communication interface and a processor. The processor is configured to obtain an NT Local Area Network Manager (NTLM) authentication token, which authenticates a client device to a service using an NTLM authentication protocol. The processor is further configured to, subsequently to obtaining the NTLM authentication token, receive, via the communication interface, from another processor that belongs to the client device, a challenge that was sent to the client device by the service in response to a request, from the client device, to access the service. The processor is further configured to, using the NTLM authentication token, compute a response to the received challenge, and to communicate the computed response to the client device, without exposing the NTLM authentication token to the client device. Other embodiments are also described.

34 Claims, 4 Drawing Sheets

(56) References Cited

U.S. PATENT DOCUMENTS

| | | |
|---|---|---|
| 6,405,318 B1 | 6/2002 | Rowland |
| 6,581,162 B1 | 6/2003 | Angelo et al. |
| 7,272,723 B1 | 9/2007 | Abbott et al. |
| 7,370,202 B2 | 5/2008 | Appenzeller et al. |
| 7,653,633 B2 | 1/2010 | Villella et al. |
| 7,664,960 B1 | 2/2010 | Clubb |
| 7,958,347 B1* | 6/2011 | Ferguson ............... H04L 9/321 713/155 |
| 8,127,345 B2 | 2/2012 | Gregg et al. |
| 8,826,028 B1 | 9/2014 | Boyington |
| 8,868,927 B1 | 10/2014 | Lee et al. |
| 9,009,825 B1 | 4/2015 | Chang et al. |
| 9,024,720 B2 | 5/2015 | Bliding et al. |
| 9,148,405 B2 | 9/2015 | Narendra et al. |
| 9,154,488 B2 | 10/2015 | Innes et al. |
| 9,160,742 B1 | 10/2015 | Ackerman et al. |
| 9,191,381 B1 | 11/2015 | Popp et al. |
| 9,286,457 B2 | 3/2016 | Beatson et al. |
| 9,509,688 B1 | 11/2016 | Shaashua et al. |
| 10,051,001 B1* | 8/2018 | Ashley ............... H04L 63/14 |
| 10,154,049 B2 | 12/2018 | Sancheti et al. |
| 10,713,280 B2 | 7/2020 | Horowitz et al. |
| 10,740,353 B2 | 8/2020 | Horowitz et al. |
| 2004/0049693 A1 | 3/2004 | Douglas |
| 2005/0278384 A1 | 12/2005 | Lin et al. |
| 2006/0064503 A1 | 3/2006 | Brown et al. |
| 2006/0236370 A1 | 10/2006 | John et al. |
| 2007/0289006 A1 | 12/2007 | Ramachandran et al. |
| 2009/0113537 A1 | 4/2009 | Woo |
| 2010/0180120 A1 | 7/2010 | Frenkel et al. |
| 2010/0278339 A1 | 11/2010 | Frenkel et al. |
| 2012/0113857 A1 | 5/2012 | Narayanaswamy et al. |
| 2012/0173759 A1 | 7/2012 | Agarwal et al. |
| 2013/0007239 A1 | 1/2013 | Agarwal et al. |
| 2014/0157393 A1 | 6/2014 | Whitcomb |
| 2014/0181529 A1 | 6/2014 | Joyce, III |
| 2014/0359694 A1 | 12/2014 | MaxWell et al. |
| 2015/0200943 A1 | 7/2015 | Pitre |
| 2015/0365412 A1 | 12/2015 | Innes et al. |
| 2016/0014077 A1 | 1/2016 | Plotnik et al. |
| 2016/0087957 A1 | 3/2016 | Shah et al. |
| 2016/0088022 A1 | 3/2016 | Handa et al. |
| 2016/0164866 A1 | 6/2016 | Oberheide et al. |
| 2016/0180068 A1 | 6/2016 | Das et al. |
| 2017/0126660 A1 | 5/2017 | Brannon |
| 2017/0141975 A1 | 5/2017 | John et al. |
| 2017/0244730 A1 | 8/2017 | Sancheti et al. |
| 2017/0286516 A1 | 10/2017 | Horowitz et al. |
| 2017/0286518 A1 | 10/2017 | Horowitz et al. |
| 2017/0310659 A1* | 10/2017 | Pranam ............... H04L 63/0815 |
| 2017/0346830 A1 | 11/2017 | Goldfarb et al. |
| 2019/0036924 A1 | 1/2019 | Wang et al. |

FOREIGN PATENT DOCUMENTS

| | | |
|---|---|---|
| WO | 2010082095 A2 | 7/2010 |
| WO | 2018096471 A1 | 5/2018 |
| WO | 2018234980 A1 | 12/2018 |

OTHER PUBLICATIONS

European Application # 17873015.6 search report dated Apr. 28, 2020.
Sherry et al., "Making Middleboxes Someone Else's Problem: Network Processing as a Cloud Service", Proceedings of the ACM SIGCOMM 2012 conference on Applications, technologies, architectures, and protocols for computer communication, pp. 13-24, Helsinki, Finland, Aug. 13-17, 2012.
International Application # PCT/IB2019/061083 search report dated Mar. 17, 2020.
ImperialViolet—Security Keys, pp. 1-17, Mar. 27, 2018.
Reddit, "Centralized Authentication Server with U2F Keys", pp. 1-5, Jul. 15, 2019 https://www.reddit.com/r/selfhosted/comments/bd2jyu/centralized_authentication_server_with_u2f_keys/.
Github, "U2F security token emulator written in Rust", pp. 1-3, Jul. 15, 2019 https://github.com/danstiner/rust-u2f.
Wright et al., "Bringing U2F to the Masses", pp. 1-12, Feb. 24, 2017.
EP Application # 18819885.7 Search Report dated Feb. 11, 2021.
Microsoft Corporation, "NT LAN Manager (NTLM) Authentication Protocol Specification", pp. 1-95, Oct. 16, 2015.
Balfanz et al., "Transport Layer Security (TLS) Channel IDs draft-balfanz-tls-channelid-01", Network Working Group, Internet-Draft, pp. 1-18, Jun. 29, 2013.
Bonneau et al., "The Quest to Replace Passwords:A Framework for Comparative Evaluation of Web Authentication Schemes", IEEE Symposium on Security and Privacy, pp. 1-15, San Francisco, USA, May 20-23, 2012.
Lunden, I., "Microsoft Buys Israeli Hybrid Cloud Security Startup Aorato In $200M Deal", pp. 1-5, Nov. 13, 2014.
International Application # PCT/IB2017/055516 search report dated Dec. 20, 2017.
International Application # PCT/IB2017/057337 search report dated Feb. 13, 2018.
International Application # PCT/IB2018/054491 search report dated Sep. 5, 2018.
Steves et al., "Report: Authentication Diary Study", NISTIR 7983, National Institute of Standards and Technology, pp. 1-166, Feb. 2014.
Bhargava, R., "LDAP vs Active Directory vs JumpCloud: which is Best? | JumpCloud", pp. 1-10, Jan. 26, 2015.
Microsoft Azure, "What is Azure Active Directory?", pp. 1-5, May 9, 2019 https://docs.microsoft.com/en-us/azure/active-directory/fundamentals/active-directory-whatis.
Verizon., "Data breach digest—Scenarios from the field", pp. 1-84, year 2016.
Amazon Web service Inc., "AWS Directory Service", pp. 1-5, Dec. 13, 2015.
U.S. Appl. No. 16/612,422 Office Action dated Sep. 27, 2021.

* cited by examiner

PROTECTION OF AUTHENTICATION TOKENS

CROSS-REFERENCE TO RELATED APPLICATIONS

The present application claims the benefit of U.S. Provisional Application 62/393,672, entitled "Secure and frictionless user authentication system," filed Sep. 13, 2016, whose disclosure is incorporated herein by reference.

FIELD OF THE INVENTION

The present invention relates to the field of computer security.

BACKGROUND

A Windows domain is an association of internetworked devices in which all user accounts are registered with at least one domain controller (DC). Each user within a domain receives a unique user account that can be assigned access to resources within the domain.

One of the common protocols used for authentication in domain networks is NT Local Area Network Manager (NTLM). In NTLM, the user's device (i.e., the "client device," or "client") stores an authentication token, which is typically derived from an authentication factor, such as a password, of the user. This authentication token is also stored on the DC, and/or on other servers that host services associated with the domain. In some cases, the client independently calculates this authentication token; in other cases, e.g., if a more secure authentication factor such as a smartcard is used in lieu of a password, the DC may send this authentication token to the client. Using this authentication token, the client may access services that belong to the domain, or are otherwise associated with the domain, even without providing the authentication factor from which the authentication token was derived.

More specifically, upon the client requesting to access any service associated with the domain, the service passes a challenge to the client, requiring that the client perform a mathematical operation using the authentication token, and then return the result of this operation to the service. The service may then validate the result, or send the result to the DC for validation. If the service or DC confirms that the client's response is correct, the service authenticates the client, such that the client may access the service. This type of authentication mechanism is known as a single sign-on (SSO) mechanism, in that the user need provide the underlying authentication factor only once, at login.

U.S. Pat. No. 9,154,488, whose disclosure is incorporated herein by reference, describes a method of authentication and accessing resources. A client device may send a request to a proxy device to access a resource, such as an enterprise resource. The proxy device may authenticate with one or more servers associated with the resource. During authentication, the proxy device may receive a request for a signature controlled by the client device. In response, the proxy device may send a request to the client device for the signature. The request may also include context information that identifies a data structure of authentication information exchanged (or to be exchanged) during the authentication session. If the client device verifies the context information, the client device may send the requested signature.

U.S. Pat. No. 6,581,162, whose disclosure is incorporated herein by reference, describes a secure environment for entering and storing information necessary to conduct encryption processes. In a computer system according to the disclosure, session keys, passwords, and encryption algorithms are maintained in a secure memory space such as System Management Mode (SMM) memory. In one disclosed embodiment, a user password is entered via a secure keyboard channel. The password is maintained in a secure memory space that is not accessible during normal computer operation. In addition to the user password, optional node identification information is stored in secure memory. The node identification information is appended to the user password, and both are subsequently encrypted by an encryption algorithm and encryption keys that are also stored in secure memory. Following the encryption process, the encrypted password and node identification information are communicated directly from secure memory to network interface circuitry for communication over a network. In another disclosed embodiment of the invention, data entered in a secure manner is utilized as an encryption key (or to generate an encryption key) for securely encrypting packets of data prior to communicating the data over a computer network. The encryption key data entered by the user is securely stored for use in multiple encryption processes during a communication session, thereby alleviating the overhead of repeated key renegotiation that is typically required. In addition, an encryption key that is no longer needed can be safely destroyed in secure memory without the danger of unidentified copies of the key remaining in computer memory.

SUMMARY OF THE INVENTION

There is provided, in accordance with some embodiments of the present invention, apparatus that includes a communication interface and a processor. The processor is configured to obtain an NT Local Area Network Manager (NTLM) authentication token, which authenticates a client device to a service using an NTLM authentication protocol. The processor is further configured to, subsequently to obtaining the NTLM authentication token, receive, via the communication interface, from another processor that belongs to the client device, a challenge that was sent to the client device by the service in response to a request, from the client device, to access the service. The processor is further configured to, using the NTLM authentication token, compute a response to the received challenge, and to communicate the computed response to the client device, without exposing the NTLM authentication token to the client device.

In some embodiments, the processor is configured to obtain the NLTM authentication token by:

receiving, from the client device, an authentication factor that is associated with a user of the client device, and computing the NTLM authentication token from the authentication factor.

In some embodiments, the service is associated with a domain, and the processor is configured to receive the authentication factor from the client device by appearing to the client device as a domain controller (DC) of the domain.

In some embodiments, the authentication factor is a password, and the processor is configured to receive the password from the client device during a password-changing operation performed by the user.

In some embodiments, the processor is configured to obtain the NTLM authentication token by receiving the NTLM authentication token from the client device during a password-changing operation performed by a user of the client device.

In some embodiments, the service is associated with a domain, and the processor is configured to obtain the NTLM authentication token from a domain controller (DC) of the domain.

In some embodiments,
the service is associated with a domain,
a domain controller (DC) of the domain initially associates a user of the client device with a first password,
the processor is further configured to replace the first password with a second password that is unknown to the client device, such that the DC associates the user with the second password instead of the first password, and
the processor is configured to obtain the NTLM authentication token by computing the NTLM authentication token from the second password.

In some embodiments,
the processor is further configured to ascertain that the client device possesses another authentication token, which authenticates the client device to the processor, and
the processor is configured to communicate the computed response to the client device in response to ascertaining that the client device possesses the other authentication token.

In some embodiments, the processor is configured to ascertain that the client device possesses the other authentication token by receiving the other authentication token from the client device, and the processor is configured to communicate the computed response to the client device in response to receiving the other authentication token from the client device.

In some embodiments,
the other authentication token is valid only during a validity interval,
the processor is further configured to ascertain that the other authentication token was received from the client device during the validity interval, and
the processor is configured to communicate the computed response to the client device in response to ascertaining that the other authentication token was received during the validity interval.

In some embodiments, the processor is further configured to identify an identifier of the client device that is received from the client device with the other authentication token, and the processor is configured to communicate the computed response to the client device in response to identifying the identifier.

In some embodiments,
the processor is further configured to, subsequently to receiving the challenge, ascertain that a user of the client device possesses at least one given authentication factor, and
the processor is configured to communicate the computed response to the client device in response to ascertaining that the user possesses the given authentication factor.

In some embodiments, the processor is configured to ascertain that the user possesses the at least one given authentication factor by:
requesting the given authentication factor from the user, and
subsequently to requesting the given authentication factor, receiving the given authentication factor from the user.

In some embodiments, the processor is further configured to, subsequently to receiving the challenge, compute at least one measure of risk associated with the request from the client device being granted, and the processor is configured to communicate the computed response to the client device in response to the measure of risk.

There is further provided, in accordance with some embodiments of the present invention, apparatus that includes a communication interface and a processor. The processor is configured to request access to a service using an NT Local Area Network Manager (NTLM) authentication protocol, and to receive, from the service, a challenge that requires an NTLM authentication token, the challenge having been sent to the processor responsively to the processor requesting access to the service. The processor is further configured to pass the received challenge, via the communication interface, to another processor, to receive, from the other processor, a response to the challenge that was computed using the NTLM authentication token, and to send the received response to the service.

In some embodiments,
the communication interface includes a network interface, and
the processor is configured to pass the received challenge to the other processor via the network interface.

In some embodiments,
the communication interface includes a universal serial bus (USB) interface, and
the processor is configured to pass the received challenge to the other processor via the USB interface.

In some embodiments, the apparatus further includes a memory, and the processor is further configured to, prior to requesting access to the service:
compute the NTLM authentication token,
send the computed NTLM authentication token to the other processor, and
subsequently to sending the computed NTLM authentication token to the other processor, delete the computed NTLM authentication token from the memory, such that the NTLM authentication token is subsequently unknown to the processor.

In some embodiments, the processor is configured to compute the NTLM authentication token during a password-changing operation.

In some embodiments, the apparatus further includes a memory, and the processor is further configured to, prior to requesting access to the service:
receive the NTLM authentication token,
send the received NTLM authentication token to the other processor, and
subsequently to sending the received NTLM authentication token to the other processor, delete the received NTLM authentication token from the memory, such that the NTLM authentication token is subsequently unknown to the processor.

There is further provided, in accordance with some embodiments of the present invention, a method that includes obtaining an NT Local Area Network Manager (NTLM) authentication token, which authenticates a client device to a service using an NTLM authentication protocol, by another device. The method further includes, subsequently to obtaining the NTLM authentication token, receiving from the client device, by the other device, a challenge that was sent to the client device by the service in response to a request, from the client device, to access the service. The method further includes, using the NTLM authentication token, computing, by the other device, a response to the received challenge, and communicating the computed response to the client device, without exposing the NTLM authentication token to the client device.

There is further provided, in accordance with some embodiments of the present invention, a method that includes requesting, by a client device, using an NT Local Area Network Manager (NTLM) authentication protocol, access to a service. The method further includes receiving from the service, by the client device, a challenge that requires an NTLM authentication token, the challenge having been sent to the client device responsively to the client device requesting access to the service. The method further includes passing the received challenge to another device that stores the NTLM authentication token, receiving from the other device, by the client device, a response to the challenge that was computed using the NTLM authentication token, and sending, by the client device, the received response to the service.

There is further provided, in accordance with some embodiments of the present invention, apparatus that includes a network interface and a processor. The processor is configured to obtain an authentication token, which authenticates a client device to a service. The processor is further configured to, subsequently to obtaining the authentication token, receive over a network, from the client device, via the network interface, a challenge that was sent to the client device by the service in response to a request, from the client device, to access the service. The processor is further configured to, using the authentication token, compute a response to the received challenge, and to communicate the computed response to the client device, without exposing the authentication token to the client device.

There is further provided, in accordance with some embodiments of the present invention, apparatus that includes a network interface and a processor. The processor is configured to request access to a service, and to receive, from the service, a challenge that requires an authentication token, the challenge having been sent to the processor responsively to the processor requesting access to the service. The processor is further configured to pass the received challenge over a network, via the network interface, to another processor, to receive, from the other processor, a response to the challenge that was computed using the authentication token, and to send the received response to the service.

The present invention will be more fully understood from the following detailed description of embodiments thereof, taken together with the drawings, in which:

DETAILED DESCRIPTION OF EMBODIMENTS

Glossary

Figure 1:
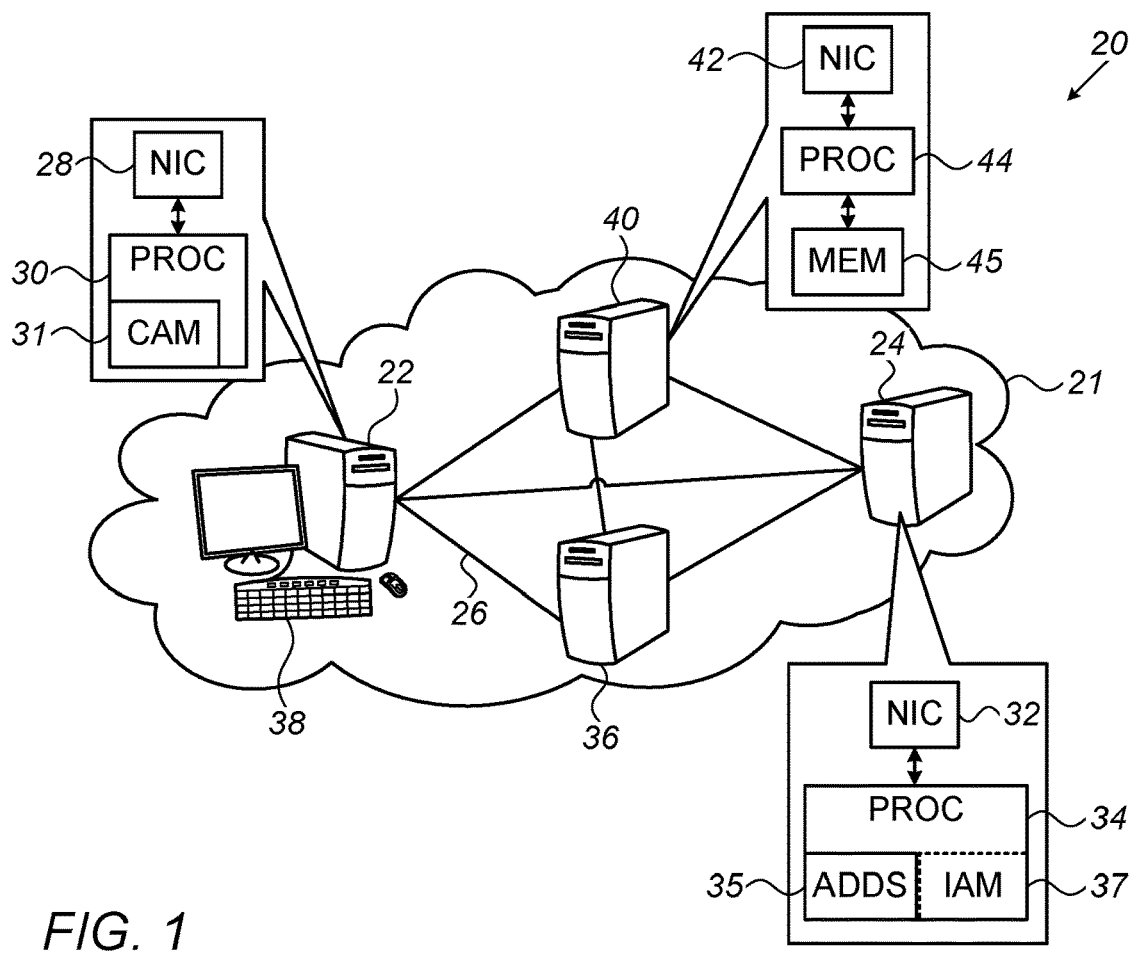
FIG. 1 is a schematic illustration of a system for secure authentication, in accordance with some embodiments of the present invention.

Since the authentication token used for NTLM is typically generated by a hash operation (e.g., by hashing the user's password), the present application generally refers to this authentication token as an "NTLM hash."

In the context of the present application, including the claims, the term "service" may include, within its scope, any local service, or remote service accessible over a computer network, such as, for example, any application, application server, data storage device, computer, or other communication device. The term "service" may also include any identity and access management application for a domain network, such as a privileged access management application, cloud access application, or internal applications portal.

In the context of the present application, including the claims, the term "authentication factor" generally refers to any item, such as a password, smartcard key, or biometric factor, provided by a user for use in authenticating the user. The term "authentication token," on the other hand, generally refers to a sequence of characters (such as numbers, letters, or other symbols), used for authentication, that is not provided by the user, but rather, is generated by the user's device, or is generated by another device and provided to the user's device. An example of an authentication token is an NTLM hash.

In the context of the present application, including the claims, the terms "user" and "client device" (or "client") may be used interchangeably, in that a particular action may be said to be performed by the client, or by the user who uses the client.

Overview

In SSO authentication protocols, the client often stores an authentication token, which is used repeatedly by the client to access various services. For example, as described above in the Background, in NTLM, the client stores a hash, which the client uses to access services in the domain. As another example, in the Kerberos authentication protocol, the client stores a Ticket Granting Ticket (TGT) and a session key received from the DC upon authenticating to the DC. A risk, therefore, is that an attacker may steal such a token from the client, and then use this token to access various services in the domain, from any device. For example, in a common type of attack over the NTLM authentication protocol, called "Pass-the-Hash (PtH)," an attacker steals a hash from the client, and subsequently uses the hash to access the domain and its various services, even without knowing the authentication factor from which the hash was computed. A PtH attack may be executed even if a relatively secure authentication factor (such as a smartcard) is used for authenticating to the domain, since, regardless of the security of the underlying authentication factor, the hash is ultimately stored on the client.

To address this risk, embodiments of the present invention provide an authentication server configured to protect a domain from PtH attacks, or, more generally, protect any service from similar types of attacks over SSO authentication protocols. To facilitate this protection, the client is inhibited from storing the relevant authentication token; rather, the authentication token is stored only on the server, such that there is a reduced chance of the authentication token being stolen. Upon the client requesting access to a particular service, the server uses the token to grant access to the client, without exposing the token to the client.

For example, in the case of NTLM, or other SSO protocols based on a similar challenge-response procedure, the client may be configured to forward any received challenges to the server. Upon receiving a challenge from the client, the server computes the response to the challenge using the stored hash, and passes the response to the client. The client then sends the response to the service, thus achieving access to the requested service. Hence, advantageously, the server may protect against PtH attacks (or analogous types of attacks) without changing the underlying authentication protocol, and without necessitating a significant change to the normal flow of communication between the client and the service; the service may continue to send challenges directly to the client, and the client may continue to send responses directly to the service.

Furthermore, the server may require that, prior to the server sending the response to the client (or even computing the response), the client authenticate itself to the server, using an authentication token that is different from, and typically more secure than, the underlying authentication token that is used to compute the response. Alternatively or additionally, the server may be configured to implement additional security measures, such that, for example, the server passes a given challenge response to the client only if the user provides one or more additional authentication factors to the server, and/or only if a given risk measure is less than a particular threshold.

For ease of description, the description below generally assumes a Windows-domain setting, in which the NTLM protocol is used to access services associated with the domain. As noted near the end of the description, however, the embodiments described herein may be applied to any suitable network setting, in which any suitable type of authentication protocol is used.

System Description

Reference is initially made to FIG. 1, which is a schematic illustration of a system 20 for secure authentication, in accordance with some embodiments of the present invention.

In the particular example shown in FIG. 1, system 20 is implemented on a network 21, such as a local area network (LAN) of a workplace, in which various computing devices communicate with each other over Ethernet cables 26 and/or over wireless connections. At least some of the networked devices in network 21 belong to a domain, which is managed by Active Directory Domain Services (ADDS) 35 running on at least one server known as a Domain Controller (DC) 24. Network 21 may include, in addition to DC 24, any number of additional servers 36, which belong to, or are otherwise associated with, the domain DC 24 and servers 36 may be accessed by at least one client 22, comprising a personal computer, tablet, mobile phone, or any other computing device. A user may use a keyboard 38, and/or any other suitable input device, to provide input to client 22.

System 20 further comprises an intelligent authentication server (IAS) 40, which is configured to manage the access of client 22 to services associated with the domain, as described in detail below. IAS 40 comprises a processor 44 and a communication interface 42, such as a NIC or any other network interface, via which processor 44 communicates with DC 24, servers 36, and client 22. In some embodiments, IAS 40 operates as a gateway (or "proxy") for DC 24, in that some or all of the communication between client 22 and DC 24 is exchanged via IAS 40. (For simplicity, however, the description below generally refers to communication exchanged between client 22 and DC 24 without explicitly noting that such communication may be exchanged via IAS 40.) In some embodiments, IAS 40 does not belong to network 21, but rather, resides "in the cloud," outside of network 21. In other embodiments, as depicted in FIG. 1, IAS belongs to network 21; typically, however, IAS 40 does not belong to the domain managed by DC 24.

System 20 further comprises a memory (MEM) 45, located on IAS 40 (as depicted in FIG. 1), or on another device. As further described below, processor 44 is configured to store sensitive information (or "authentication secrets"), such as authentication tokens and/or authentication factors, in memory 45, and to retrieve this sensitive information as required. (Such information may be encrypted prior to storage.)

DC 24 comprises a processor 34, which runs ADDS 35, i.e., implements the functionality of ADDS 35, by executing appropriate software code. DC 24 further comprises a communication interface 32, such as network interface controller (NIC) or any other network interface. Processor 34 exchanges communication with client 22, servers 36, and IAS 40 via communication interface 32.

Client 22 also comprises a processor 30 and a communication interface 28, such as a NIC or any other network interface, via which processor 30 communicates with DC 24, servers 36, and IAS 40. Processor 30 runs a client authentication module (CAM) 31, which causes processor 30 to exchange certain communication with IAS 40, as described in detail below. In some embodiments, as depicted in FIG. 1, processor 30 runs CAM 31 by executing appropriate software code installed on client 22; for example, CAM 31 may comprise an executable dynamic-link library (DLL) or software agent installed on client 22. In other embodiments, the software code for CAM 31 is contained on a separate authentication device, such as a device connectable to client 22 via a universal serial bus (USB) interface. In such embodiments, to achieve access to the services on the domain, a user is required to provide the authentication device, such that processor 30—or a separate processor on the authentication device—may run CAM 31.

In some embodiments, system 20 comprises, instead of IAS 40, an intelligent authentication module (IAM) 37, which may run on DC 24 (as depicted in FIG. 1 using a dashed outline, indicating an alternate embodiment), on client 22, on any one of servers 36, on a separate device, or on a virtual server. For example, processor 34 of DC 24 may run IAM 37, i.e., implement the functionality of IAM 37, in parallel to running ADDS 35, by executing an appropriate software patch installed on DC 24. As another example, the software code for IAM 37 (and/or a processor configured to execute this code) may reside on a separate device, such as a smartcard or USB device, which the user must provide in order to achieve access to the services on the domain. In general, any functions of IAS 40 described below may be performed by IAM 37.

IAS 40 is typically "hardened," such that the IAS is less susceptible to attacks than a less-secure component, such as client 22. For example, IAS 40 may be configured to communicate only over a certain port, and/or only using a particular communication protocol. Alternatively or additionally, the IAS may be configured to run only the application that is needed for performing the techniques described herein. Moreover, this application may process only certain types of incoming messages, such as the specific types of messages from the client and DC described below. For example, the application may compare all incoming messages to a whitelist, and process only those incoming messages whose structure matches a template contained in the whitelist. (For embodiments that include IAM 37 instead of IAS 40, IAM 37 may similarly have this limited interface.) For additional security, the IAS may execute any of the functions described herein in a trusted execution environment (TEE) or hardware secure module (HSM).

For each user, the DC recognizes a particular NTLM hash, which is typically derived from an authentication factor of the user. Without the functionality of system 20, DC 24 might send the hash to the client, or the client might calculate and store the same hash. As described in detail below, however, system 20 prevents client 22 from storing the hash recognized by the DC, such that the client may access services in the domain only via IAS 40.

In general, each of the processors described herein may be embodied as a single processor, or as a cooperatively networked or clustered set of processors. The functionality of each of the processors described herein may be implemented by any combination of hardware and software elements. For example, each of the processors described herein may be a programmed digital computing device comprising a central processing unit (CPU), random access memory (RAM), non-volatile secondary storage, such as a hard drive or CD ROM drive, network interfaces, and/or peripheral devices. Program code, including software programs, and/or data may be loaded into the RAM for execution and processing by the CPU, and results may be generated for display, output, transmittal, or storage, as is known in the art. The program code and/or data may be downloaded in electronic form, over a network, for example, or it may, alternatively or additionally, be provided and/or stored on non-transitory tangible media, such as magnetic, optical, or electronic memory. Such program code and/or data, when provided to the processor, produce a machine or special-purpose computer, configured to perform the tasks described herein.

Accessing Services in the Domain

Figure 2:
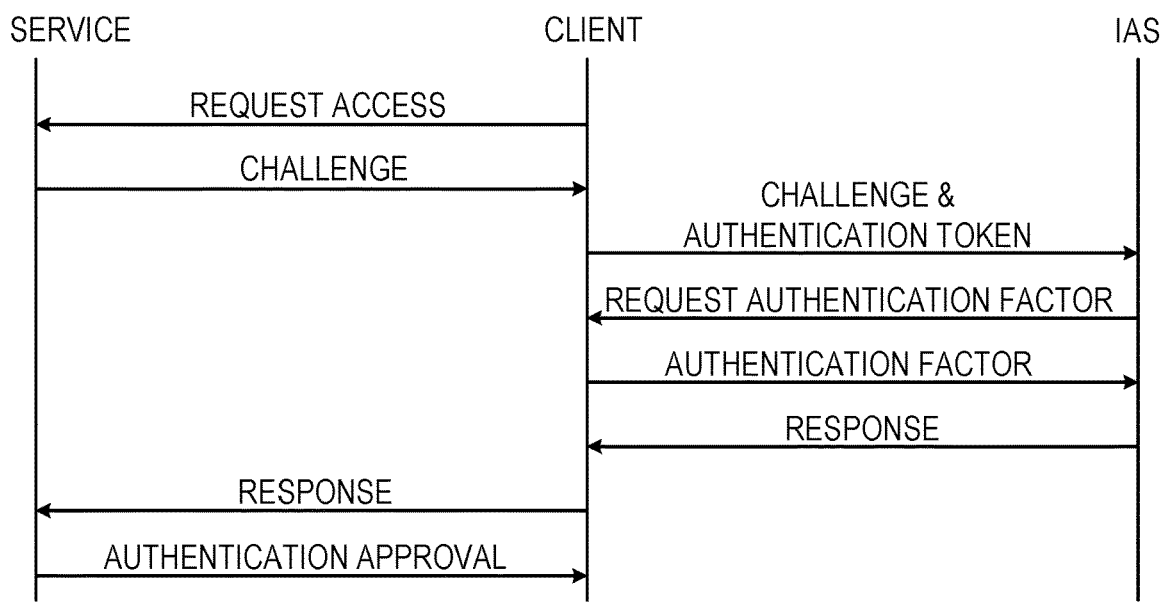
FIG. 2 is a schematic illustration of a technique for accessing a service in a domain, in accordance with some embodiments of the present invention.

Reference is now made to FIG. 2, which is a schematic illustration of a technique for accessing a service in a domain, in accordance with some embodiments of the present invention. In particular, FIG. 2 depicts a flow of communication between the client, a requested service, and the IAS, whereby the IAS helps the client access the requested service. By way of general introduction to the techniques described herein, a short description of this flow is provided, with additional details being provided with reference to the subsequent figures.

First, the client sends the service a request to access the service. The service replies by passing a challenge to the client. The client then forwards the challenge, along with an authentication token that authenticates the client to the IAS, to the IAS. (Alternatively, the IAS may pass a second challenge to the client, and require that the client compute a response to the second challenge using the authentication token, and return this response to the IAS.) After verifying the authentication token (or verifying the response to the second challenge), the IAS may, as a further security measure, ascertain whether the user of the client possesses at least one given authentication factor, such as a password or biometric factor. For example, as illustrated in FIG. 2, the IAS may request the given authentication factor from the client. Alternatively or additionally, the IAS may request that the user use a device other than the client, such as a mobile phone, to provide the given authentication factor. Alternatively or additionally, the IAS may pass a challenge to the client or to another device belonging to the user, and require that the client or other device return a response that was computed using the given authentication factor.

After receiving the requested authentication factor from the user, and/or validating the challenge response that was received from the user, the IAS computes a response to the challenge that was received from the service, and passes the response to the client. The client then forwards this response to the service. The service then verifies the response, or passes the response to the DC for verification. After the response is verified, the client achieves access to the service. (As depicted in FIG. 2, the server may send an authentication approval message to the client, indicating that the client has achieved access to the service.)

Figure 3A:
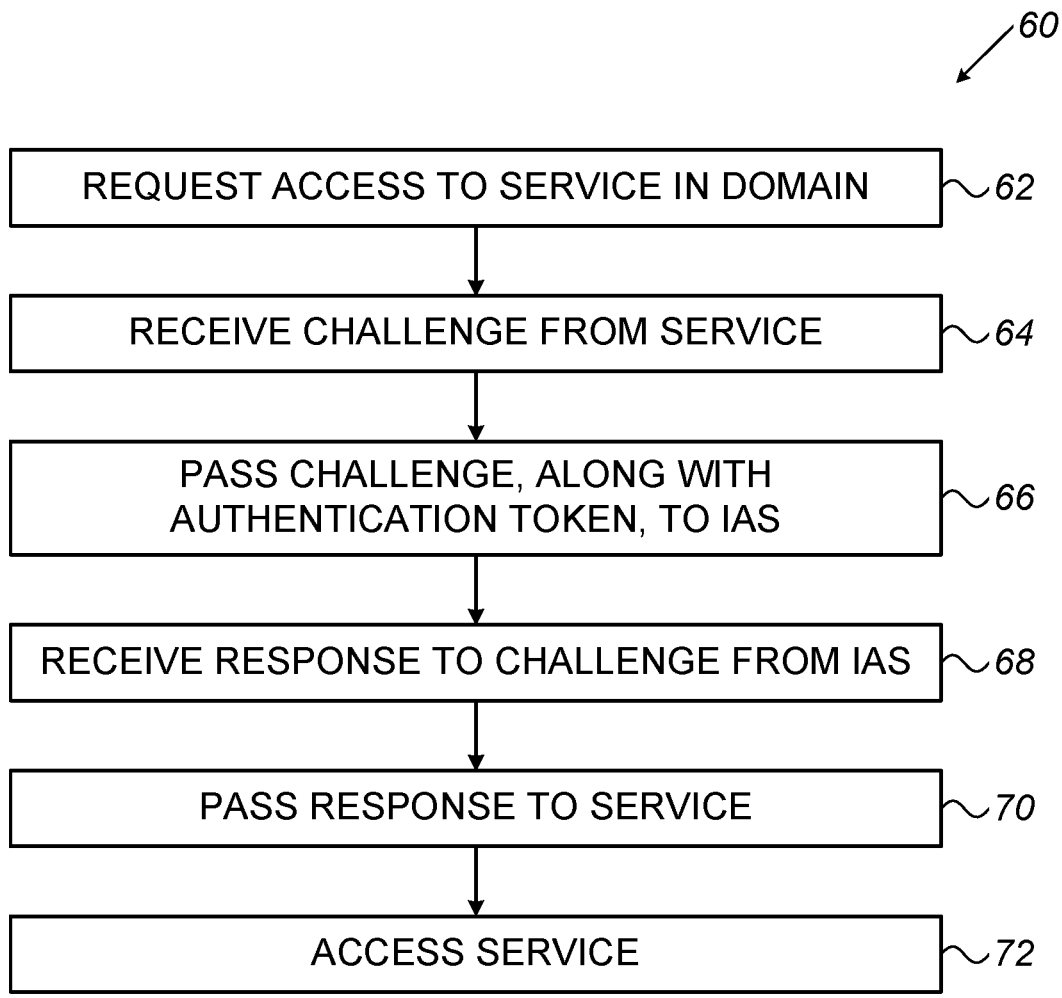
FIG. 3A is a flow diagram for a method for accessing a service in a domain, in accordance with some embodiments of the present invention.

For further details regarding the operation of the client as briefly described above with reference to FIG. 2, reference is now made to FIG. 3A, which is a flow diagram for a method 60 for accessing a service in a domain, in accordance with some embodiments of the present invention. Method 60 is performed by processor 30 of client 22, by executing instructions contained in CAM 31.

Method 60 begins with the client requesting access to a service in the domain, at an access-requesting step 62. Subsequently, at a challenge-receiving step 64, the client receives a challenge, which is passed to the client by the service in response to the client requesting access to the service. This challenge requires that the client use an NTLM hash to compute a response, and then pass this response to the service. However, given that this hash is not stored by the client, but rather, by the IAS, the client must request the response from the IAS. Hence, at a challenge-passing step 66, the client passes the challenge, along with an authentication token that authenticates the client to the IAS, to the IAS. (Alternatively, as described above with reference to FIG. 2, after passing the challenge to the IAS, the client may receive a second challenge from the IAS, compute a response to this second challenge using the authentication token, and pass the response to the IAS.)

After authenticating the client based on the received authentication token (or based on the received response to the second challenge), the IAS computes the response to the challenge received by the IAS from the client, and passes the response to the client. (As briefly described above with reference to FIG. 2, and as further described below with reference to FIG. 3B, the IAS may require, in authenticating the client, that the client perform additional steps not explicitly shown in FIG. 3A, such as passing an authentication factor to the IAS.) The client receives the response from the IAS at a response-receiving step 68, and then, at a response-passing step 70, passes the response to the service. The service then verifies the response, or (more typically) passes the response to the DC for verification. After the response has been verified, the client accesses the service, at an accessing step 72.

Figure 3B:
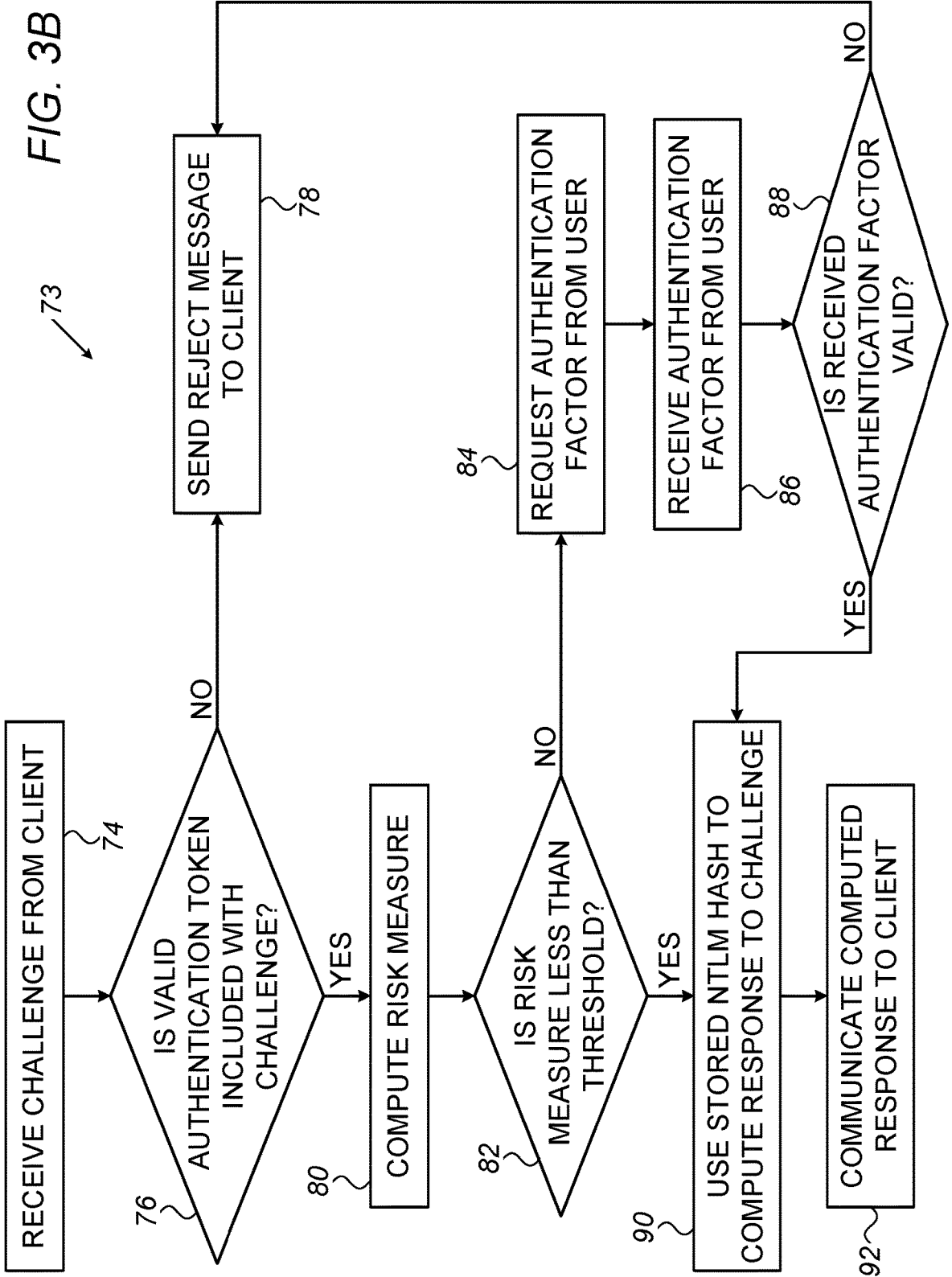
FIG. 3B is a flow diagram for a method for passing, to a client, a response to a challenge, in accordance with some embodiments of the present invention.

For further details regarding the operation of the IAS as briefly described above with reference to FIG. 2, reference is now made to FIG. 3B, which is a flow diagram for a method 73 for passing, to a client, a response to a challenge, in accordance with some embodiments of the present invention. Method 73 is performed by processor 44 of IAS 40, or by any other processor that runs IAM 37.

Method 73 begins with a challenge-receiving step 74, at which processor 44 receives, from the client, a challenge that was received by the client (at challenge-receiving step 64 of method 60 of FIG. 3A) from a service to which the client requested access. Subsequently, at a token-validating step 76, processor 44 checks whether a valid authentication token, which authenticates the client to the IAS, is included with the challenge. (Alternatively, processor 44 may send the client a second challenge, and require that the client return a response computed using a valid authentication token.) If a valid token is not found (or if no valid response to the second challenge is received), processor 44, at a rejecting step 78, sends a reject message to the client, indicating to the client that the processor refuses to give the client a response to the challenge. (Alternatively, processor 44 may simply ignore the challenge, without responding to the client.) Otherwise, in some embodiments, at a risk-measure-computing step 80, processor 44 computes at least one measure of risk associated with the request from the client being granted (i.e., with the client achieving access to the service). For example, processor 44 may compute an estimated probability that the current user of the client is malicious, e.g., based on features of the client's request such as the client's location and the time of the request, and/or based on previous requests from the same user or client.

Subsequently, in response to the measure of risk, processor 44 may use a stored NTLM hash to compute a response to the challenge, and then communicate the computed response to the client. For example, the processor may compare the risk measure to a threshold, at a risk-measure-comparing step 82. If the risk measure is less than the threshold, the processor may, at a response-computing step 90, compute a response to the challenge, and then communicate the computed response to the client at a response-communicating step 92, without communicating the hash that was used to compute the response, or exposing this hash to the client in any other way.

Returning now to measure-comparing step 82, if the risk measure is not less than the threshold, the processor may reject the client at rejecting step 78, or, as illustrated in FIG. 3B, require additional authentication from the user. For example, the processor may request from the user, at a requesting step 84, at least one authentication factor, such as a password, biometric factor, or authentication key. Subsequently, the processor receives (via the client, and/or another device) at least one authentication factor from the user, at a factor-receiving step 86. Next, at a factor-validating step 88, processor 44 checks whether the received authentication factor is valid, i.e., whether the received authentication factor is recognized by processor 44 as being associated with the user of the client. If the authentication factor is valid, the processor proceeds with response-computing step 90, as described above. Otherwise, the processor proceeds with rejecting step 78. (As noted above with reference to FIG. 2, the processor may, instead of requesting the given authentication factor from the user, require that the client or another device belonging to the user use the given authentication factor to compute a response to a challenge.)

It is noted that requesting step 84, factor-receiving step 86, and factor-validating step 88 may be performed even without the performance of risk-measure-computing step 80 and risk-measure-comparing step 82. In any case, FIG. 3B highlights an advantage of embodiments of the present invention, in that the IAS may implement additional security measures—such as the computation of risk measures and/or the requirement for additional authentication factors—that are not implemented by the DC per the original NTLM protocol. Further advantages are described below.

In some embodiments, processor 44 computes the response even before performing token-validating step 76, but sends this response to the client only after performing token-validating step 76, along with, optionally, any of the additional steps that follow token-validating step 76. Alternatively, the processor may compute the response after performing token-validating step 76, but send this response to the client only after performing one or more of the steps that follow token-validating step 76.

Some protocols, such as NTLMv2, require that the client generate a "client challenge," and then send this challenge to the service together with a single response that responds to both the service challenge (i.e., the challenge received from the service) and the client challenge. For such protocols, in embodiments of the present invention, the client may send the client challenge to the IAS together with the service challenge, or the IAS may generate the client challenge in lieu of the client. Subsequently to receiving or generating the client challenge, the IAS may compute a response to the two challenges, and then send the response, along with the client challenge, to the client. The client may then forward these two items to the service.

Obtaining the NTLM Hash by the IAS

Figure 4A:
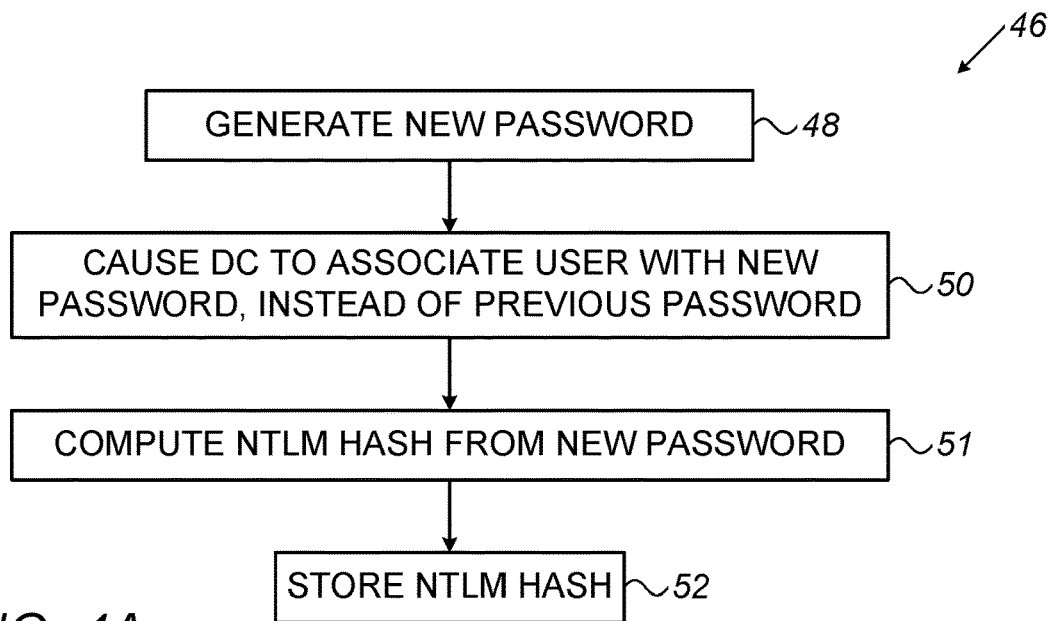
FIG. 4A is a flow diagram for a method for changing a password of a user, in accordance with some embodiments of the present invention.

As noted above, in system 20, the NTLM hash recognized by the DC is stored on the IAS, while client 22 is prevented from knowing this hash. One technique for achieving this end is illustrated in FIG. 4A, which is a flow diagram for a method 46 for changing a password of a user, in accordance with some embodiments of the present invention. The description below assumes that method 46 is performed by processor 44 of IAS 40, although, as noted above with reference to FIG. 1, any functionality of IAS 40 may alternatively be implemented by another processor running IAM 37.

Method 46 begins with a password-generating step 48, at which processor 44 generates a new password that is unknown to the user. This password may be generated from one or more authentication factors provided by the user (including the user's current password), and/or may include a randomly-generated sequence of characters.

Figure 4B:
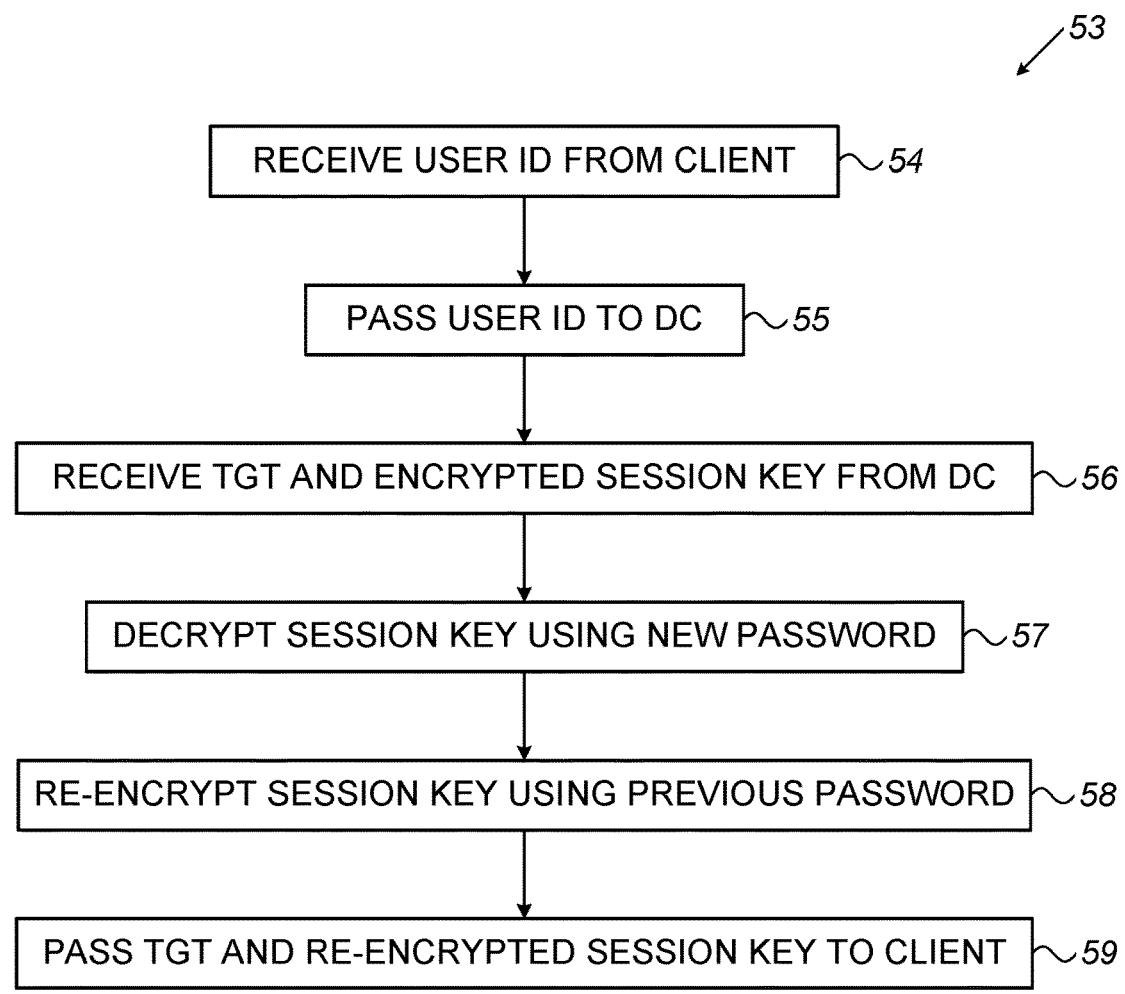
FIG. 4B is a flow diagram for a method for facilitating a Kerberos authentication request following a change of the user's password per FIG. 4A, in accordance with some embodiments of the present invention.

Subsequently, at a password-changing step 50, processor 44 replaces the user's current password with the new password generated at password-generating step 48; in other words, processor 44 causes the DC to associate the user with the new password (which is unknown to the user and the client), instead of the user's previous password. To enable password-changing step 50, processor 44 may be provided with administrative privileges on network 21. Alternatively, processor 44 may use the user's previous password to log in to the DC as the user, and then perform the password replacement. For example, as further described below with reference to FIG. 4B, the IAS may logically or physically reside between the client and the DC, such that the IAS receives at least some communication from the client that would normally be passed to the DC. Processor 44 may therefore receive a new password that was chosen by the user during a password-changing operation performed by the user, along with the user's previous password. Processor 44 may subsequently use the previous password to log in to the DC, and then change the password to the new password generated by the processor, instead of the new password that was chosen by the user.

Subsequently to (or prior to) password-changing step 50, processor 44, at a hash-computing step 51, computes an NTLM hash from the new password generated at password-generating step 48, and, at a hash-storing step 52, stores this hash in memory 45 in association with the user. (Processor 44 does not, however, at any point, send this hash to the user.) The use of the hash by processor 44 was described above, with reference to FIG. 2 and FIGS. 3A-B.

Subsequently to the change of password, the DC computes or otherwise obtains the same hash that is stored in memory 45. The client, on the other hand, possesses only the previous password (or a new password that was chosen by the user), and hence computes a different hash, which is not recognized by the DC. Hence, even if an attacker steals this hash from the client, the attacker will not be able to use this hash to access any services associated with the domain In some embodiments, as an extra security measure, processor 44 repeatedly changes the user's password in the manner described above. For example, processor 44 may change the password after each authentication performed by the user, and/or at regular intervals (e.g., once a week).

In some networks, each user uses the same password for both the Kerberos and NTLM protocols. Advantageously, however, embodiments of the present invention facilitate authentication using the Kerberos protocol, even after the user's password has been changed without the user's knowledge. In this regard, reference is now made to FIG. 4B, which is a flow diagram for a method 53 for facilitating a Kerberos authentication request following a change of the user's password per FIG. 4A, in accordance with some embodiments of the present invention.

By way of introduction, it is noted that in a password-based Kerberos authentication request that is not implemented on system 20, the user first provides, to client 22, a user ID, along with the user's password. The client then passes the user ID, but not the password, to the DC. Subsequently, the DC looks up the password associated with the user ID, uses this password to encrypt a session key, and then passes the encrypted session key, along with a TGT, to the client. The client then uses the password to decrypt the session key, and completes the authentication process.

Method 53 begins with an ID-receiving step 54, at which processor 44 (in lieu of the DC) receives the user ID of the user from client 22 during a Kerberos authentication request performed by the user. ID-receiving step 54 may be performed in a variety of ways. For example, the client may be configured (by virtue of CAM 31) to pass the user ID to the IAS, instead of passing the user ID directly to the DC. Alternatively, the IAS may appear to the client as the DC, such that the client unknowingly passes the user's ID to the IAS instead of to the DC. For example, the DNS of network 21 may be configured such that any queries for the DC return the network address of the IAS. As yet another alternative, the IAS may be configured as a KDC Proxy for the DC, or, as described above with reference to FIG. 1, the IAS may function as a physical proxy for the DC, such that all communication to the DC passes through the IAS.

Subsequently to ID-receiving step 54, processor 44 passes the user ID to the DC, at an ID-passing step 55. Subsequently, at a session-key-receiving step 56, processor 44 receives an encrypted session key, along with a TGT, from the DC. Processor 44 then uses the new password, which was generated by the processor, to decrypt the session key, at a session-key-decrypting step 57. (For example, the processor may generate a key from the new password, and then use this key to decrypt the session key.) Subsequently, at a session-key-re-encrypting step 58, processor 44 re-encrypts the session key using the user's previous password (or a new password that was chosen by the user during a password-changing operation). The processor then passes the re-encrypted session key, along with the original TGT, to the client, at a session-key-passing step 59. Since the client possesses the previous password, the client is able to decrypt the session key, and hence the user successfully authenticates to the domain. (In some embodiments, by operating as a proxy for the DC, the IAS further requires that the client request subsequent Kerberos tickets through the IAS. In such embodiments, the IAS may modify the TGT and/or session key at session-key-re-encrypting step 58, as further described below in "Other configurations and embodiments.")

In other embodiments, the general end result of method 46 of FIG. 4A—i.e., the NTLM hash recognized by the DC being known to the IAS, but unknown to the client—is achieved even without changing the user's password. In other words, even the "original" NTLM hash, which may be based on the user's original password and/or one or more other authentication factors, may be known to the IAS but not to the client. For example:

(i) The client, subsequently to either computing the hash, or receiving the hash from the DC, may send the hash to the IAS. For example, the client may be configured (by virtue of CAM 31) to send the hash to the IAS after computing or receiving the hash following a normal login operation. Alternatively, the IAS may appear to the client as the DC, or the IAS may function as a proxy for the DC, such that, in a situation in which the client would normally send the hash to the DC, the client instead sends the hash to the IAS. For example, in some cases, in a password-changing operation, the client computes the NTLM hash from the user's chosen new password, and then—in the absence of system 20—sends this hash to the DC. The IAS may therefore receive the hash from the client during a password-changing operation. (Subsequently to receiving the hash from the client, the IAS may store the hash as described above with reference to FIG. 4A, and also forward the hash to the DC.) Subsequently to sending the hash to the IAS, the client deletes the hash from its memory, such that, subsequently, the hash is known to the IAS, but is unknown to the client.

(ii) The IAS may obtain the hash from the DC, by virtue of the DC sending the hash to the IAS. For example, after computing the hash (e.g., from an authentication key stored on the user's smartcard), the DC may send the hash to the IAS. The DC may be further configured not to send the hash to the client, and/or the client may be configured not to compute the hash, or not to store any hash received from the DC. As another example, after the DC receives the hash from the client during a password-changing operation, the DC may send the hash to the IAS; separately, after sending the hash to the DC, the client may delete the hash from its memory.

Alternatively, the IAS may be provided administrative privileges, such that the IAS may retrieve the hash from DC 24. As before, the DC may be configured not to send the hash to the client, and/or the client may be configured not to compute the hash, or not to store any hash received from the DC.

In general, the IAS may be synchronized with the DC using any suitable technique, such that any new hashes obtained by the DC are shared with the IAS, either by virtue of the DC sending these hashes to the IAS, or by virtue of the IAS retrieving these hashes from the DC.

(iii) The IAS may receive the user's authentication factor (i.e., the authentication factor that is associated, by the DC, with the user) from the client, by virtue of the client being configured to pass the user's authentication factor to the IAS, by virtue of the IAS appearing to the client as the DC, or by virtue of the IAS functioning as a proxy for the DC. (For example, the IAS may receive the user's password during a password-changing operation, by any of the aforementioned techniques.) Alternatively, the IAS may receive the user's authentication factor from a network administrator. Subsequently, the IAS may compute the hash from this authentication factor. Separately, the client may be configured not to compute the hash (or to delete the hash immediately after computing the hash), and/or the DC may be configured not to send the hash to the client.

Authenticating the Client to the IAS

As described above with reference to FIG. 2 and FIGS. 3A-B, the IAS is typically configured to pass a response to the client only if the IAS ascertains that the client possesses a particular authentication token. (As described above, the IAS may ascertain this by receiving the authentication token from the client, or by receiving, from the client, a response to a challenge that requires this authentication token.) In some embodiments, the IAS sends this authentication token to the client after login, e.g., in response to receiving particular authentication factors, such as a username and password, from the user of the client. In other embodiments, the IAS and the client each independently compute this authentication token, e.g., following receipt by the IAS of any required authentication factors. Subsequently to the client receiving or computing the authentication token, the client may use the authentication token for authenticating to the IAS.

Advantageously, the authentication token used for authenticating to the IAS may be more secure than an NTLM hash, such that, even if an attacker steals this token, the ability of the attacker to use the token is limited. Hence, the original lower-security process for authenticating to the service, per the original NTLM protocol, may be replaced with a higher-security process for authenticating to the IAS.

For example, processor 44 of the IAS may store the authentication token in memory 45 in association with an identifier, such as a device name and/or network address, of client 22. Upon receiving the authentication token from the client, processor 44 may, in executing token-validating step 76 of method 73 (FIG. 3B), (a) identify the client identifier that is received with the authentication token (e.g., in the packet that carries the authentication token), (b) retrieve, from memory 45, the identifier that is associated with this authentication token, and then (c) compare the two identifiers with one another. Alternatively, the token may be constructed by encrypting the identifier of client 22 along with other parameters, such that, upon receiving the token, processor 44 may, in executing token-validating step 76, (a) ascertain the client identifier that is received with the authentication token, (b) decrypt the token using a private or public encryption key, and identify any decrypted identifier in the decrypted token, and then (c) compare the two identifiers with one another. In either case, if the compared identifiers do not match one another, the processor may refuse to return a response to the challenge, as described above with reference to FIG. 3B. Hence, an attacker may be prevented from authenticating to the IAS from any device other than client 22.

Alternatively or additionally, the authentication token may be valid only for a particular validity interval, such that, if an attacker attempts to use the authentication token after the validity interval has passed, the processor may refuse to return a response to the challenge. As above, the validity interval may be stored in memory 45 in association with the token, or encrypted as part of the token, such that processor 44 may, in executing token-validating step 76, verify that the token was received during the validity interval. The validity interval of the token may vary in its length, depending on any various factors. One such factor is the user's level of privilege with respect to services on the domain; a lower-privileged user may be given a longer validity interval than a higher-privileged user. Alternatively or additionally to being valid only for a particular validity interval, the authentication token for authenticating to the IAS may be changed after each login or logout operation performed by the user.

Upon expiry of a given token (e.g., at the end of the token's validity interval), the IAS may request any suitable authentication factors, such as a username and password, from the user. Upon receipt of the requested authentication factors, the IAS may compute an updated token, and then send this token to the client; alternatively, the client may, in parallel to the IAS, compute the same updated token.

In general, the client may store the authentication token for authenticating to the IAS in the same location in which hashes are stored per the usual NTLM protocol. Alternatively, the client may store this token in a more secure environment, such as a TEE.

Other Configurations and Embodiments

In some embodiments, system 20 further comprises a secure Authentication Policy Manager (APM), which may run on the IAS, on any of the other servers described above, or on another, dedicated server. The APM may be used for monitoring system components, verifying the integrity of any installed components, distributing any updates, or performing any other relevant management task. (In some embodiments, the IAS is configured to log all access attempts, and to pass this log to the APM.) Alternatively or additionally, the APM may direct the IAS to apply different authentication policies for different types of authentication tokens, different services, or different users or clients. (Thus, for example, the IAS may require an additional authentication factor to authenticate some clients, but not others.) A system administrator may use a user interface, such as keyboard and/or monitor, to receive output from the APM, and/or configure the policies defined by the APM.

As noted above, FIG. 1 depicts an embodiment in which the client, the IAS, and the server hosting the requested service are separate devices that exchange communication with each other over a network. In other embodiments, a single device includes multiple modules (e.g., software modules) that, respectively, implement the functionality of two or more of the aforementioned system components. These modules may communicate with each other using any suitable communication interface, such as, for example, a USB communication interface.

For example, as described above with reference to FIG. 1, the functionality of the IAS may be performed by another entity, such as a software component—namely, IAM 37—running on the client, on the DC, or on the server hosting the requested service. Alternatively or additionally, the requested service itself—comprising, for example, a particular application—may run in a separate environment on the client. (In view of the above, it is noted that references herein, including in the claims, to the "client device" or "client" generally exclude the IAM or service, even in the case that one or both of these components runs on the client. Thus, for example, reference may be made to the client device receiving a challenge from the service and forwarding this challenge to the IAM, even if the service and/or the IAM run on the client device.)

As a specific example, IAM 37 may be embodied by a secure application installed on the client, which, by virtue of the security features described above with reference to FIG. 1 (e.g., a limited interface), and/or by virtue of running in a secure environment, such as a TEE, is less susceptible to attack than the application used by the client to access the service. Alternatively, IAM 37 may be embodied by a secure application residing on a separate device connectable to the client via any suitable communication interface, such as a USB or smartcard interface. For example, each user of the domain may be provided with a separate respective device, such as a USB or smartcard device, that comprises a user-specific IAM. An advantage of such embodiments, in addition to the security features described above, is that each IAM is required to store only a relatively small number of authentication secrets. For example, the IAM of a given user need store only a single hash—that of the user—rather than the multiple hashes stored by a central IAS. In such embodiments, processor 30 of the client may execute both CAM 31 and IAM 37; alternatively, for embodiments in which the IAM resides on a separate device, the separate device may further comprise a separate secure processor for running the IAM.

It is noted that the techniques described herein may be practiced with any suitable authentication protocol. For example, as briefly noted above with reference to FIG. 4B, the IAS may enhance the security of Kerberos authentication, by replacing the original TGT issued by the DC with a new TGT having enhanced security features, and requiring that this new TGT be validated by the IAS before any tickets are granted by the DC. For example, the new TGT may be useable only by a certain client device, and/or only during a validity interval that varies in accordance with relevant factors, such as the user's level of privilege on the network. Alternatively or additionally, the IAS may require that the client authenticate to the IAS using one or more additional authenticating factors, along with the TGT.

Alternatively, the IAS may act as an intermediary between the client and the DC for the Kerberos protocol, such that the IAS plays the role of the DC with respect to the client, and the role of the client with respect to the DC. For example, instead of passing the TGT and session key to the client, the DC may pass these items to the IAS. Subsequently, the client may send any ticket requests to the IAS, instead of sending such requests to the DC. After receiving a given ticket request, the IAS may validate an authentication token received with the request, and/or perform any other relevant security measures, such as those described above with reference to FIG. 3B. If, responsively to these security measures, the IAS decides to grant the request, the IAS may send the ticket request, along with the TGT and the session key, to the DC. The DC may then communicate the requested ticket to the IAS, and the IAS may then forward the ticket to the client.

As another example, any of the techniques described hereinabove may be practiced with any authentication protocol that requires using a hash, and/or any other authentication token, to respond to a challenge from a service. Such a protocol may be used on a domain network, or on any other suitable type of network having an identity-and-access-management server analogous to DC 24.

It will be appreciated by persons skilled in the art that the present invention is not limited to what has been particularly shown and described hereinabove. Rather, the scope of the present invention includes both combinations and subcombinations of the various features described hereinabove, as well as variations and modifications thereof that are not in the prior art, which would occur to persons skilled in the art upon reading the foregoing description.

The invention claimed is:

1. An apparatus for authenticating a client device to a service associated with a domain, the apparatus comprising:
   a memory;
   a communication interface; and
   a processor, configured to:
   replace a first password, with which a domain controller (DC) of the domain initially associates a user of the client device, with a second password that is unknown to the client device, such that the DC associates the user with the second password instead of the first password,
   compute an NT Local Area Network Manager (NTLM) authentication token, which authenticates the client device to the service using an NTLM authentication protocol, from the second password,
   subsequently to computing the NTLM authentication token, receive, via the communication interface, from another processor that belongs to the client device, a challenge that was sent to the client device by the service in response to a request, from the client device, to access the service,
   using the NTLM authentication token, compute a response to the received challenge, and
   communicate the computed response to the client device, without exposing the NTLM authentication token to the client device.

2. The apparatus according to claim 1, wherein the processor is further configured to generate the second password by:
   receiving, from the client device, an authentication factor that is associated with the user of the client device, and
   generating the second password from the authentication factor.

3. The apparatus according to claim 2, wherein the processor is configured to receive the authentication factor from the client device by appearing to the client device as the DC of the domain.

4. The apparatus according to claim 2, wherein the authentication factor is a password, and wherein the processor is configured to receive the password from the client device during a password-changing operation performed by the user.

5. The apparatus according to claim 1,
   wherein the processor is further configured to ascertain that the client device possesses another authentication token, which authenticates the client device to the processor, and
   wherein the processor is configured to communicate the computed response to the client device in response to ascertaining that the client device possesses the other authentication token.

6. The apparatus according to claim 5, wherein the processor is configured to ascertain that the client device possesses the other authentication token by receiving the other authentication token from the client device, and wherein the processor is configured to communicate the computed response to the client device in response to receiving the other authentication token from the client device.

7. The apparatus according to claim 6,
   wherein the other authentication token is valid only during a validity interval,
   wherein the processor is further configured to ascertain that the other authentication token was received from the client device during the validity interval, and wherein the processor is configured to communicate the computed response to the client device in response to ascertaining that the other authentication token was received during the validity interval.

8. The apparatus according to claim 6, wherein the processor is further configured to identify an identifier of the client device that is received from the client device with the other authentication token, and wherein the processor is configured to communicate the computed response to the client device in response to identifying the identifier.

9. The apparatus according to claim 1,
wherein the processor is further configured to, subsequently to receiving the challenge, ascertain that the user of the client device possesses at least one given authentication factor, and
wherein the processor is configured to communicate the computed response to the client device in response to ascertaining that the user possesses the given authentication factor.

10. The apparatus according to claim 9, wherein the processor is configured to ascertain that the user possesses the at least one given authentication factor by:
requesting the given authentication factor from the user, and
subsequently to requesting the given authentication factor, receiving the given authentication factor from the user.

11. The apparatus according to claim 1, wherein the processor is further configured to, subsequently to receiving the challenge, compute at least one measure of risk associated with the request from the client device being granted, and wherein the processor is configured to communicate the computed response to the client device in response to the measure of risk.

12. An apparatus, comprising:
a memory;
a communication interface; and
a processor, configured to:
obtain an NT Local Area Network Manager (NTLM) authentication token,
subsequently to obtaining the NTLM authentication token, send the NTLM authentication token to another processor,
subsequently to sending the NTLM authentication token to the other processor, delete the NTLM authentication token from the memory, such that the NTLM authentication token is subsequently unknown to the processor,
subsequently to deleting the NTLM authentication token from the memory, request access to a service using an NTLM authentication protocol,
receive, from the service, a challenge that requires the NTLM authentication token, the challenge having been sent to the processor responsively to the processor requesting access to the service,
pass the received challenge, via the communication interface, to the other processor,
receive, from the other processor, a response to the challenge that was computed using the NTLM authentication token, and
send the received response to the service.

13. The apparatus according to claim 12,
wherein the communication interface comprises a network interface, and
wherein the processor is configured to pass the received challenge to the other processor via the network interface.

14. The apparatus according to claim 12,
wherein the communication interface comprises a universal serial bus (USB) interface, and
wherein the processor is configured to pass the received challenge to the other processor via the USB interface.

15. The apparatus according to claim 12, wherein the processor is further configured to obtain the NTLM authentication token by computing the NTLM authentication token.

16. The apparatus according to claim 15, wherein the processor is configured to compute the NTLM authentication token during a password-changing operation.

17. The apparatus according to claim 12, wherein the processor is further configured to obtain the NTLM authentication token by receiving the NTLM authentication token.

18. A method for authenticating a client device to a service associated with a domain, the method comprising:
replacing a first password, with which a domain controller (DC) of the domain initially associates a user of the client device, with a second password that is unknown to the client device, such that the DC associates the user with the second password instead of the first password,
using another device, computing, from the second password, an NT Local Area Network Manager (NTLM) authentication token, which authenticates the client device to the service using an NTLM authentication protocol;
subsequently to computing the NTLM authentication token, receiving from the client device, by the other device, a challenge that was sent to the client device by the service in response to a request, from the client device, to access the service;
using the NTLM authentication token, computing, by the other device, a response to the received challenge; and
communicating the computed response to the client device, without exposing the NTLM authentication token to the client device.

19. The method according to claim 18, further comprising generating the second password by:
receiving, from the client device, an authentication factor that is associated with the user of the client device, and
generating the second password from the authentication factor.

20. The method according to claim 19, wherein the service is associated with a domain, and wherein receiving the authentication factor from the client device comprises receiving the authentication factor from the client device by appearing to the client device as the DC of the domain.

21. The method according to claim 19, wherein the authentication factor is a password, and wherein receiving the password from the client device comprises receiving the password from the client device during a password-changing operation performed by the user.

22. The method according to claim 18, further comprising ascertaining that the client device possesses another authentication token, which authenticates the client device to the other device, wherein communicating the computed response to the client device comprises communicating the computed response to the client device in response to ascertaining that the client device possesses the other authentication token.

23. The method according to claim 22, wherein ascertaining that the client device possesses the other authentication token comprises ascertaining that the client device possesses the other authentication token by receiving the other authentication token from the client device, and wherein communicating the computed response to the client device comprises communicating the computed response to the client device in response to receiving the other authentication token from the client device.

24. The method according to claim 23,
wherein the other authentication token is valid only during a validity interval,
wherein the method further comprises ascertaining that the other authentication token was received from the client device during the validity interval, and
wherein communicating the computed response to the client device comprises communicating the computed response to the client device in response to ascertaining that the other authentication token was received during the validity interval.

25. The method according to claim 23, further comprising identifying an identifier of the client device that is received from the client device with the other authentication token, wherein communicating the computed response to the client device comprises communicating the computed response to the client device in response to identifying the identifier.

26. The method according to claim 18, further comprising, subsequently to receiving the challenge, ascertaining that the user of the client device possesses at least one given authentication factor, wherein communicating the computed response to the client device comprises communicating the computed response to the client device in response to ascertaining that the user possesses the given authentication factor.

27. The method according to claim 26, wherein ascertaining that the user possesses the at least one given authentication factor comprises ascertaining that the user possesses the at least one given authentication factor by:
requesting the given authentication factor from the user; and
subsequently to requesting the given authentication factor, receiving the given authentication factor from the user.

28. The method according to claim 18, further comprising, subsequently to receiving the challenge, computing at least one measure of risk associated with the request from the client device being granted, wherein communicating the computed response to the client device comprises communicating the computed response to the client device in response to the measure of risk.

29. A method, comprising:
obtaining by a client device, an NT Local Area Network Manager (NTLM) authentication token,
subsequently to obtaining the NTLM authentication token, sending the NTLM authentication token from the client device to another device,
subsequently to sending the NTLM authentication token to the other device, deleting the NTLM authentication token from a memory of the client device, such that the NTLM authentication token is subsequently unknown to the client device,
subsequently to deleting the NTLM authentication token from the memory, requesting, by the client device, using an NTLM authentication protocol, access to a service;
receiving from the service, by the client device, a challenge that requires the NTLM authentication token, the challenge having been sent to the client device responsively to the client device requesting access to the service;
passing the received challenge to the other device;
receiving from the other device, by the client device, a response to the challenge that was computed using the NTLM authentication token; and
sending, by the client device, the received response to the service.

30. The method according to claim 29, wherein passing the received challenge to the other device comprises passing the received challenge to the other device via a network interface.

31. The method according to claim 29, wherein passing the received challenge to the other device comprises passing the received challenge to the other device via a universal serial bus (USB) interface.

32. The method according to claim 29, wherein obtaining the NTLM authentication token comprises obtaining the NTLM authentication token by computing, by the client device, the NTLM authentication token.

33. The method according to claim 32, wherein computing the NTLM authentication token comprises computing the NTLM authentication token during a password-changing operation.

34. The method according to claim 29, further comprising, prior to requesting access to the service: wherein obtaining the NTLM authentication token comprises obtaining the NTLM authentication token by
receiving, by the client device, the NTLM authentication token.

* * * * *